(12) United States Patent
Moll et al.

(10) Patent No.: US 7,366,092 B2
(45) Date of Patent: Apr. 29, 2008

(54) HASH AND ROUTE HARDWARE WITH PARALLEL ROUTING SCHEME

(75) Inventors: Laurent Moll, Saratoga, CA (US); Barton J. Sano, Fremont, CA (US); Thomas Albert Petersen, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 883 days.

(21) Appl. No.: 10/684,871

(22) Filed: Oct. 14, 2003

(65) Prior Publication Data

US 2005/0078601 A1    Apr. 14, 2005

(51) Int. Cl.
*H04J 1/16* (2006.01)
*H04L 12/28* (2006.01)

(52) U.S. Cl. ..................... 370/218; 370/422
(58) Field of Classification Search .......... 370/218, 370/351, 386–389, 400–402, 419, 422–426
See application file for complete search history.

(56) References Cited

U.S. PATENT DOCUMENTS

| | | | | |
|---|---|---|---|---|
| 6,266,705 B1* | 7/2001 | Ullum et al. | ............... | 709/238 |
| 6,385,209 B1* | 5/2002 | Skirmont et al. | ........... | 370/419 |
| 6,480,490 B1* | 11/2002 | Merchant et al. | ........... | 370/389 |
| 6,580,712 B1* | 6/2003 | Jennings et al. | ............ | 370/392 |
| 6,661,787 B1* | 12/2003 | O'Connell et al. | ......... | 370/389 |
| 6,714,553 B1* | 3/2004 | Poole et al. | ................ | 370/412 |
| 6,990,102 B1* | 1/2006 | Kaniz et al. | ................ | 370/392 |
| 7,099,325 B1* | 8/2006 | Kaniz et al. | ................ | 370/392 |
| 2001/0055274 A1* | 12/2001 | Hegge et al. | ............... | 370/229 |
| 2002/0097736 A1* | 7/2002 | Cohen | ........................ | 370/419 |
| 2002/0116535 A1* | 8/2002 | Ryals et al. | ................ | 709/249 |
| 2004/0122973 A1* | 6/2004 | Keck et al. | ................ | 709/238 |

* cited by examiner

*Primary Examiner*—Wing Chan
*Assistant Examiner*—Hong Sol Cho
(74) *Attorney, Agent, or Firm*—Garlick Harrison & Markison; Bruce E. Garlick

(57) ABSTRACT

A multiprocessor switching device substantially implemented on a single CMOS integrated circuit is described in connection with a parallel routing scheme for calculating routing information for incoming packets. Using the programmable hash and route routing scheme, a hash and route circuit can be programmed for a variety of applications, such as routing, flow-splitting or load balancing.

14 Claims, 6 Drawing Sheets

HASH AND ROUTE HARDWARE WITH PARALLEL ROUTING SCHEME

RELATED APPLICATIONS

This application is related to U.S. Provisional Patent Application Ser. No. 60/380,740, filed May 15, 2002; U.S. Provisional Patent Application Ser. No. 60/331,789, filed Nov. 20, 2001; U.S. Provisional Patent Application Ser. No. 60/344,713, filed Dec. 24, 2001; U.S. Provisional Patent Application Ser. No. 60/348,777, filed Jan. 14, 2002 and U.S. Provisional Patent Application Ser. No. 60/348,717, filed Jan. 14, 2002, each of which is incorporated herein by reference in its entirety.

BACKGROUND OF THE INVENTION

1. Field of the Invention

The present invention is directed in general to data communications. In one aspect, the present invention relates to a method and system for packet routing in high-speed data communication systems.

2. Related Art

As is known, communication technologies that link electronic devices are many and varied, servicing communications via both physical media and wirelessly. Some communication technologies interface a pair of devices, other communication technologies interface small groups of devices, and still other communication technologies interface large groups of devices.

Examples of communication technologies that couple small groups of devices include buses within digital computers, e.g., PCI (peripheral component interface) bus, ISA (industry standard architecture) bus, USB (universal serial bus), and SPI (system packet interface). One relatively new communication technology for coupling relatively small groups of devices is the HyperTransport (HT) technology, previously known as the Lightning Data Transport technology (HyperTransport I/O Link Specification "HT Standard"). The HT Standard sets forth definitions for a high-speed, low-latency protocol that can interface with today's buses like AGP, PCI, SPI, 1394, USB 2.0, and 1 Gbit Ethernet as well as next generation buses including AGP 8x, Infiniband, PCI-X, PCI 3.0, and 10 Gbit Ethernet. HT interconnects provide high-speed data links between coupled devices. Most HT enabled devices include at least a pair of HT ports so that HT enabled devices may be daisy-chained. In an HT chain or fabric, each coupled device may communicate with each other coupled device using appropriate addressing and control. Examples of devices that may be HT chained include packet data routers, server computers, data storage devices, and other computer peripheral devices, among others.

Of these devices that may be HT chained together, many require significant processing capability and significant memory capacity. While a device or group of devices having a large amount of memory and significant processing resources may be capable of performing a large number of tasks, significant operational difficulties exist in coordinating the operation of multiprocessors. For example, while each processor may be capable of executing a large number of operations in a given time period, the operation of the processors must be coordinated and memory must be managed to assure coherency of cached copies. In a typical multi-processor installation, each processor typically includes a Level 1 (L1) cache coupled to a group of processors via a processor bus. The processor bus is most likely contained upon a printed circuit board. A Level 2 (L2) cache and a memory controller (that also couples to memory) also typically couples to the processor bus. Thus, each of the processors has access to the shared L2 cache and the memory controller and can snoop the processor bus for its cache coherency purposes. This multi-processor installation (node) is generally accepted and functions well in many environments.

Because network switches and web servers often times require more processing and storage capacity than can be provided by a single small group of processors sharing a processor bus, in some installations, multiple processor/memory groups (nodes) are sometimes contained in a single device. In these instances, the nodes may be rack mounted and may be coupled via a back plane of the rack. Unfortunately, while the sharing of memory by processors within a single node is a fairly straightforward task, the sharing of memory between nodes is a daunting task. Memory accesses between nodes are slow and severely degrade the performance of the installation. Many other shortcomings in the operation of multiple node systems also exist. These shortcomings relate to cache coherency operations, interrupt service operations, etc.

An additional challenge for multiprocessor configurations is the routing of packet data within the multiprocessor devices. For example, routing information for an incoming packet must be calculated upon reception to determine if the packet destination is a destination within that device or if the packet is to be transmitted to another node coupled thereto. Conventional approaches for making routing calculations have required hardwired ASIC circuits, or have been implemented as regular network processors that require the (local) processor(s) to make state machine type determinations for every packet routing decision. In addition to consuming processor resources, the state machine approach can also impose significant buffer storage devices to hold the packet while the routing decision is being made, especially where a subsequent state relies on a prior packet bit.

In addition to the foregoing challenges, an HT enabled device that is incorporated into a system (e.g., an HT enabled server, router, etc. that is incorporated into a circuit-switched system or packet-switched system) must interface with a legacy device that uses an older communication protocol. For example, if a line card were developed with HT ports, the line card would need to communicate with legacy line cards that include SPI ports. Also, where multiple HT enabled nodes are connected through an external HT switch, the routing function can be impeded where the switch disregards packet information.

Therefore, a need exists for methods and/or apparatuses for interfacing devices with an efficient routing scheme while overcoming the bandwidth limitations, latency limitations, limited concurrency, and other limitations associated with the use of a high-speed chain of linked nodes. Further limitations and disadvantages of conventional systems will become apparent to one of skill in the art after reviewing the remainder of the present application with reference to the drawings and detailed description which follow.

SUMMARY OF THE INVENTION

In accordance with the present invention, an integrated circuit system and method are provided for making routing and distribution decisions for incoming packets by using a hash and route circuit block that can be programmed for a variety of applications and functions, such as routing, flow splitting or load balancing. A plurality of independent rules and paths are applied to predetermined fields or bits in the received packet to generate an index that is used directly as a routing decision or indirectly to access a routing table to obtain a routing decision. In addition, multiple interleaved packets of different channels can be simultaneously processed and routed by tracking the hash and route results for each channel.

In a selected embodiment, a multiprocessor switching chip is provided with a receiver port and multiple destination modules, such as a packet manager input circuit and at least one transmit circuit integrated within the chip. A routing circuit coupled to the port receives packets is programmably configured to select a destination module for each packet by calculating a routing signal without requiring processor intervention. The routing circuit calculates the routing signal by using programmably selected control and data information extracted from the received packet as said received packet is being received. In one embodiment, the routing circuit includes a rule table that contains a plurality of independent rules that process data from the received packet in parallel as each packet is received to generate rule table outputs for each rule contained in the rule table. The routing circuit may also include a path table containing a plurality of paths that combine the rule table outputs from the rule table to generate a routing signal for the received packet. The routing signal may be used in a variety of ways to direct the received packet to a destination module. For example, the routing signal may be directly output as a routing result from the routing circuit to switch the received packet to a destination module identified by the routing result. The routing signal may also be used as an index to a routing table to output a routing result to switch the received packet to a destination module identified by the routing result. Alternatively or in addition, the routing signal may be used in combination with a hashed and/or extracted value to generate an index to a routing table to output a routing result to switch the received packet to a destination module identified by the hashed and/or extracted value and the routing result. The routing signal may also be a switch hop routing signal that is used to route the received packet over an HT switch device coupled to the multiprocessor switching chip. In connection with the present invention, the routing circuit may receive multiple interleaved packets on a plurality of input virtual channels and generate an output virtual channel that is used by the multiprocessor switching chip to route packets to the appropriate destination modules. In the routing circuit, an offset circuit is provided for specifying a location of data information in the received packet that is to be extracted by the routing circuit, or for specifying a location of an offset pointer in the received packet, where said offset pointer specifies a location of data information in the received packet that is to be extracted by the routing circuit.

In an alternate selected embodiment, a method is provided for routing a packet to one of a plurality of destinations in a processor circuit. According to the method, a packet is received on a receiver port of the processor circuit. The packet is decoded to extract data and control information which is used to calculate a routing decision for the packet while the packet is being received. For example, the routing decision may be calculated by performing a series of table lookup operations in a rule table and associated path table. The routing decision is used to generate a routing result which directly or indirectly identifies a destination in the processor circuit to which the packet is transferred, such as by indexing into a routing table with the routing result. Alternatively, programmably selected bytes from the data or control information for extraction and/or hashing to generate a hashed value that is used to index into a routing table to output a routing result. The calculation of the routing decision may require determining an offset that defines a location (or an offset to a location) in the packet from which data and control information is extracted.

In an another selected embodiment, a hash and route circuit is provided for routing packet data that has been extracted from a packet received on an input virtual channel. The packet data is routed to an output virtual channel by decoding and processing a received packet to extract packet data and input virtual channel information for the packet. A rule table is provided that includes a plurality of programmable rules, where each rule selects at least one byte from the packet data or the input virtual channel information and compares the selected at least one byte to an operand of the rule to generate a true/false result for the rule. A path table is connected to the rule table to receive the true/false results from the rule table. The said path table searches for selected true/false results from the rule table and outputs path data from a matching entry which may be may be directly output as an output virtual channel or may be used as an index to a route table which outputs an output virtual channel or may be used to select an output of a hash function as an index to the route table.

The objects, advantages and other novel features of the present invention will be apparent from the following detailed description when read in conjunction with the appended claims and attached drawings.

DETAILED DESCRIPTION

Figure 1:
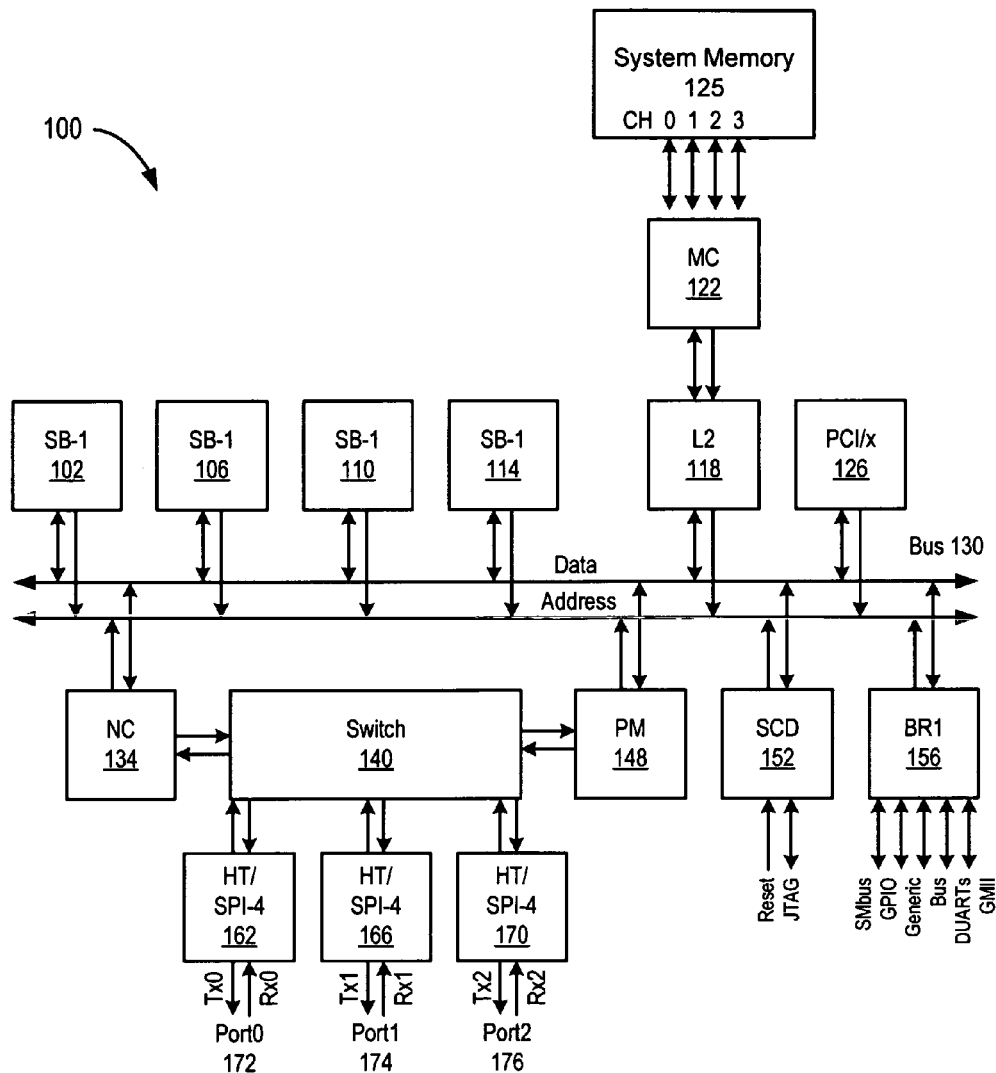
FIG. 1 shows a block diagram of a network multiprocessor switching system-on-a-chip.

An apparatus and method in accordance with the present invention provide a system for routing incoming packets through a multiprocessor switching system-on-a-chip. A system level description of the operation of an embodiment of the multiprocessor switching system of the present invention is shown in FIG. 1 which depicts a schematic block diagram of a multiprocessor device 100 in accordance with the present invention. The multiprocessor device 100 may be an integrated circuit or it may be constructed from discrete components. The multiprocessor device 100 includes a plurality of processing units 102, 106, 110, 114, cache memory 118, memory controller 122, which interfaces with on and/or off-chip system memory, an internal bus 130, a node controller 134, a switching module 140, a packet manager 148, a system controller 152 and a plurality of configurable packet based interfaces 162, 166, 170, such as three flexible HyperTransport/SPI-4 Phase 2 links.

As shown in FIG. 1, the four processors 102, 106, 110, 114 are joined to the internal bus 130. When implemented as standard MIPS64 cores, the processors 102, 106, 110, 114 have floating-point support, and are independent, allowing applications to be migrated from one processor to another if necessary. The processors 102, 106, 110, 114 may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture. The system 100 may include any number of processors (e.g., as few as one processor, two processors, four processors, etc.). In addition, each processing unit 102, 106, 110, 114 may include a memory sub-system (level 1 cache) of an instruction cache and a data cache and may support separately, or in combination, one or more processing functions. With respect to the processing system example of FIG. 2, each processing unit 102, 106, 110, 114 may be a destination within multiprocessor device 100 and/or each processing function executed by the processing modules 102, 106, 110, 114 may be a source within the processor device 100.

The internal bus 130 may be any form of communication medium between the devices coupled to the bus. For example, the bus 130 may include shared buses, crossbar connections, point-to-point connections in a ring, star, or any other topology, meshes, cubes, etc. In selected embodiments, the internal bus 130 may be a split transaction bus (i.e., having separate address and data phases). The data phases of various transactions on the bus may proceed out of order with the address phases. The bus may also support coherency and thus may include a response phase to transmit coherency response information. The bus may employ a distributed arbitration scheme, and may be pipelined. The bus may employ any suitable signaling technique. For example, differential signaling may be used for high speed signal transmission. Other embodiments may employ any other signaling technique (e.g., TTL, CMOS, GTL, HSTL, etc.). Other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice. Furthermore, the bus may not be pipelined, if desired. In addition, the internal bus 130 may be a high-speed (e.g., 128-Gbit/s) 256 bit cache line wide split transaction cache coherent multiprocessor bus that couples the processing units 102, 106, 110, 114, cache memory 118, memory controller 122 (illustrated for architecture purposes as being connected through cache memory 118), node controller 134 and packet manager 148 together. The bus 130 may run in big-endian and little-endian modes, and may implement the standard MESI protocol to ensure coherency between the four CPUs, their level 1 caches, and the shared level 2 cache 118. In addition, the bus 130 may be implemented to support all on-chip peripherals, including a 66-MHz PCI/PCI-X interface 126 and the input/output bridge interface 156 for the generic bus, SMbus, UARTs, GOIP and Ethernet MAC. A JTAG interface 152 performs debugging.

The cache memory 118 may function as an L2 cache for the processing units 102, 106, 110, 114, node controller 134 and/or packet manager 148. With respect to the processing system example of FIG. 2, the cache memory 118 may be a destination within multiprocessor device 100.

The memory controller 122 provides an interface to system memory, which, when the multiprocessor device 100 is an integrated circuit, may be off-chip and/or on-chip. With respect to the processing system example of FIG. 2, the system memory may be a destination within the multiprocessor device 100 and/or memory locations within the system memory may be individual destinations within the device 100 (as illustrated with channels 0-3). Accordingly, the system memory may include one or more destinations for the multi-node processing systems. The memory controller 122 is configured to access the system memory in response to read and write commands received on the bus 130. The L2 cache 118 may be coupled to the bus 130 for caching various blocks from the system memory for more rapid access by agents coupled to the bus 130. In such embodiments, the memory controller 122 may receive a hit signal from the L2 cache 118, and if a hit is detected in the L2 cache for a given read/write command, the memory controller 122 may not respond to that command. Generally, a read command causes a transfer of data from the system memory (although some read commands may be serviced from a cache such as an L2 cache or a cache in the processors 102, 106, 110, 114) and a write command causes a transfer of data to the system memory (although some write commands may be serviced in a cache, similar to reads). The memory controller 122 may be designed to access any of a variety of types of memory. For example, the memory controller 122 may be designed for synchronous dynamic random access memory (SDRAM), and more particularly double data rate (DDR) SDRAM. Alternatively, the memory controller 122 may be designed for DRAM, DDR synchronous graphics RAM (SGRAM), DDR fast cycle RAM (FCRAM), DDR-II SDRAM, Rambus DRAM (RDRAM), SRAM, or any other suitable memory device or combinations of the above mentioned memory devices.

The node controller 134 functions as a bridge between the internal bus 130 and the configurable packet-based interfaces 162, 166, 170. Accordingly, accesses originated on either side of the node controller will be translated and sent on to the other. The node controller also supports the distributed shared memory model associated with the cache coherency non-uniform memory access (CC-NUMA) protocol.

The packet manager 148 circuitry communicates packets between the interfaces 162, 166, 170 and the system memory, and may be a direct memory access (DMA) engine that writes packets received from the switching module 140 into input queues of the system memory and reads packets from output queues of the system memory to the appropriate configurable packet-based interface 162, 166, 170. The packet manager 148 may include a packet manager input and a packet manager output each having its own DMA engine and associated cache memory. The cache memory may be arranged as first in first out (FIFO) buffers that respectively support the input queues and output queues.

The packet manager circuit 148 comprises circuitry shared by the interfaces 162, 166, 170. The packet manager may generate write commands to the memory controller 122 to write received packets to the system memory, and may generate read commands to read packets from the system memory for transmission by one of the interfaces 162, 166, 170. In some embodiments, the packet manager 148 may be a more efficient use of hardware than having individual DMA engines for each of the interfaces 162, 166, 170. Additionally, the packet manager may simplify communication on the bus 130, in some embodiments, for packet data transfers. It is noted that, in some embodiments, the system 100 may include an L2 cache coupled to the bus 130. The packet manager 148 may be configured, in some embodiments, to cause a portion of the packet data to be stored into the L2 cache in addition to being stored in memory. In some embodiments, the packet manager 148 may use descriptors to locate the memory locations for reading and writing packet data. The packet manager 148 may read and write the descriptors as well.

In some embodiments, the interfaces 162, 166, 170 may have dedicated communication paths to the node controller 134 or packet manager 148. However, in the illustrated embodiment, the system 100 employs a switch 140. The switch 140 may selectively couple one of the receive/transmit interfaces 162, 166, 170 to the node controller 134 or packet manager 148 to transfer received data. The switch 140 may selectively couple the packet manager 148 to one of the interfaces 162, 166, 170 to transfer packet data from the packet manager 148 to the interfaces 162, 166, 170 for transmission on the corresponding ports 172, 174, 176. The switch 140 may have request/grant interfaces to each of the interfaces 162, 166, 170 and the packet manager 148 for requesting transfers and granting those transfers. As will be appreciated, a receive/transmit interface includes any circuitry configured to communicate on a port according to the protocol defined for the port. The interface may include receive circuitry configured to receive communications on the port and to transmit the received communications to other circuitry internal to the system that includes the interface. The interface may also include transmit circuitry configured to receive communications from the other circuitry internal to the system and configured to transmit the communications on the port. The switching module 140 functions to direct data traffic, which may be in a generic format, between the node controller 134 and the configurable packet-based interfaces 162, 166, 170 and between the packet manager 148 and the configurable packet-based interfaces. The generic format may include 8 byte data words or 16 byte data words formatted in accordance with a proprietary protocol, in accordance with asynchronous transfer mode (ATM) cells, in accordance with internet protocol (IP) packets, in accordance with transmission control protocol/internet protocol (TCP/IP) packets, and/or in general, in accordance with any packet-switched protocol or circuit-switched protocol. In a selected embodiment, a 256-Gbit/s switch 140 connects the on-chip memory 118 and processors 102, 106, 110, 114 to the three HyperTransport/SPI-4 links 162, 166, 170, and provides transparent forwarding of network, ccNUMA access, and HyperTransport packets when necessary.

The configurable packet-based interfaces 162, 166, 170 generally function to convert data from a high-speed communication protocol (e.g., HT, SPI, etc.) utilized between multiprocessor devices 100 and the generic format of data within the multiprocessor devices 100. Accordingly, the configurable packet-based interface 162, 166, 170 may convert received HT or SPI packets into the generic format packets or data words for processing within the multiprocessor device 100, such as by using a receiver interface (which amplifies and time aligns the data received via the physical link and then converts the received protocol-formatted data into data from a plurality of virtual channels having the generic format), hash and route block (described herein) and receiver buffer for holding the data until a routing decision is made. Packets arriving through receiver interface(s) of the chip can be decoded in either SPI-4 mode (native packet mode) or in HT mode, in which case, it uses a special extension called Packet-over-HT (PoHT) to transfer the packets. From a logical perspective, both modes provide almost identical services. In addition, the configurable packet-based interfaces 162, 166, 170 may convert outbound (transmit) data of a plurality of virtual channels in the generic format received from the switching module 140 into HT packets or SPI packets, such as by using a transmitter formatter and transmitter interface, which take the incoming packet data chunks from the switch and format them according to the mode it is configured in, and then drive the high-speed formatted stream of data onto the physical link coupling the present multiprocessor device 100 to another multiprocessor device. The particular conversion of packets to generic formatted data performed by the configurable packet-based interfaces 162, 166, 170 is based on configuration information, which, for example, indicates configuration for HT to generic format conversion or SPI to generic format conversion.

In one embodiment, the interfaces 162, 166, 170 may support a set of virtual channels (VCs) in which packets are transmitted. A virtual channel corresponds to the notion of "port" in the SPI-4 specification, and may be used to provide virtual independent flow of packets. The VC is "virtual" in that all the datapaths are provided through a single physical channel, for example by time-multiplexing multiple flows through a single physical channel. Each virtual channel is defined to flow independent of the other virtual channels, even though the virtual channels may share certain physical resources (e.g., the port 172, 174, 176 on which the packets are flowing). These virtual channels may be mapped to internal virtual channels (also referred to as output virtual channels). The datapaths of the high-speed ports 162, 166, 170, the switch 140, and the packet manager 148 all support virtual channels. That is, the switch may grant a coupling between a source and a destination based not only on the ability of the source to transfer data and the destination to receive data, but also on the ability of the source to transfer data in a particular output virtual channel and the destination to receive data on that output virtual channel. Thus, requests from sources may indicate the destination and the virtual channel on which data is to be transferred, and requests from destinations may indicate the virtual channel on which data may be received. Additionally, in some embodiments, the switch 140 may merge inputs to a given destination virtual channel on a packet boundary. That is, if two sources are requesting to transfer packet data to the same destination and virtual channel, and one of the sources has been granted to that destination and virtual channel, the switch inhibits granting to the other source for that destination and virtual channel until the current source reaches a packet boundary.

In one embodiment, the system 100 (and more particularly the processors 102, 106, etc., the memory controller 122, the interfaces 162, 166, etc., the node controller 134, the packet manager 148, the switch 140, and the bus 130) may be integrated onto a single integrated circuit as a system on a chip configuration. Additional circuitry (such as PCI interfaces, serial interfaces, Personal Computer Memory Card International Association (PCMCIA) interfaces, etc.) may also be integrated. Alternatively, other embodiments may implement one or more of the devices as separate integrated circuits. In another configuration, the system memory may be integrated as well. Alternatively, one or more of the components may be implemented as separate integrated circuits, or all components may be separate integrated circuits, as desired. Any level of integration may be used.

As will be understood, the multiprocessor device 100 of the present invention provides multiprocessing functionality on its own which makes it suitable for scientific and embedded applications requiring significant computational capabilities. In a selected embodiment, the multiprocessor device 100 of the present invention contains a number of peripherals along with its sophisticated memory and communication support. For example, in a selected embodiment, the processor cores (e.g., 102) are 0.8 to 1.2-GHz, 64-bit MIPS with 64 kbytes of level one cache memory per processor and 1 Mbyte of level two cache 118 per chip; an 800-MHz DDR controller 122; off-chip ccNUMA support and optional ECC support. Three 8/16-bit receive/transmit ports 162, 166, 170 are also provided that are configurable as either HyperTransport or SPI-4 links. Additional peripheral features include a 32-bit 33/66-MHz PCI interface 126; an input/output bridge 156 that includes a 10/100/1000 Ethernet MAC interface, general-purpose I/O ports, SMBus serial interfaces and four DUARTs.

In addition to providing stand alone computational functions, the multiprocessor devices 100 may also be used support communication-oriented applications that need significant computational support, like an array of HyperTransport linked chips for use with Internet service routers and switches with deep content switching and differentiated services such as quality-of-service (QoS) and virtual private networks (VPNs), and may also be used in Internet-Protocol (IP) servers and subscriber-management platforms, servers supporting high computational requirements for scientific or Enterprise Java environments, and wireless infrastructure equipment. With three ports 172, 174, 176 on the chip, up to eight chips can be connected via the HyperTransport links in a "cube" configuration of nodes, for a 32-processor system.

When used in a HyperTransport linked network, the multiprocessor devices 100 provide a highly integrated nonuniform memory access (NUMA) architecture with low power consumption that multiplexes memory and I/O traffic on the same link. In contrast to conventional symmetrical multiprocessing systems (where all processors have the same memory access time and a bus or switch acts as an interface between processors and the memory subsystem so that cache coherence is maintained by monitoring the bus or the switch traffic), with NUMA, the memory address space is made up of the combined local memory (e.g., system memory 125) from each node in the system. A processor can access its local memory faster than nonlocal memory. NUMA systems have the advantage of being easily expanded, while adding a processor to a conventional SMP shared memory architecture is more difficult because an additional port is needed.

By using a cache-coherent form of NUMA (ccNUMA), on-chip caches can remain up to date even while data moves through the processor/memory interconnect. The on-chip double-data-rate (DDR) memory controller 122 supports the chip's local, off-chip memory, and its HyperTransport links 162, 166, 170 provide ccNUMA support.

Figure 2:
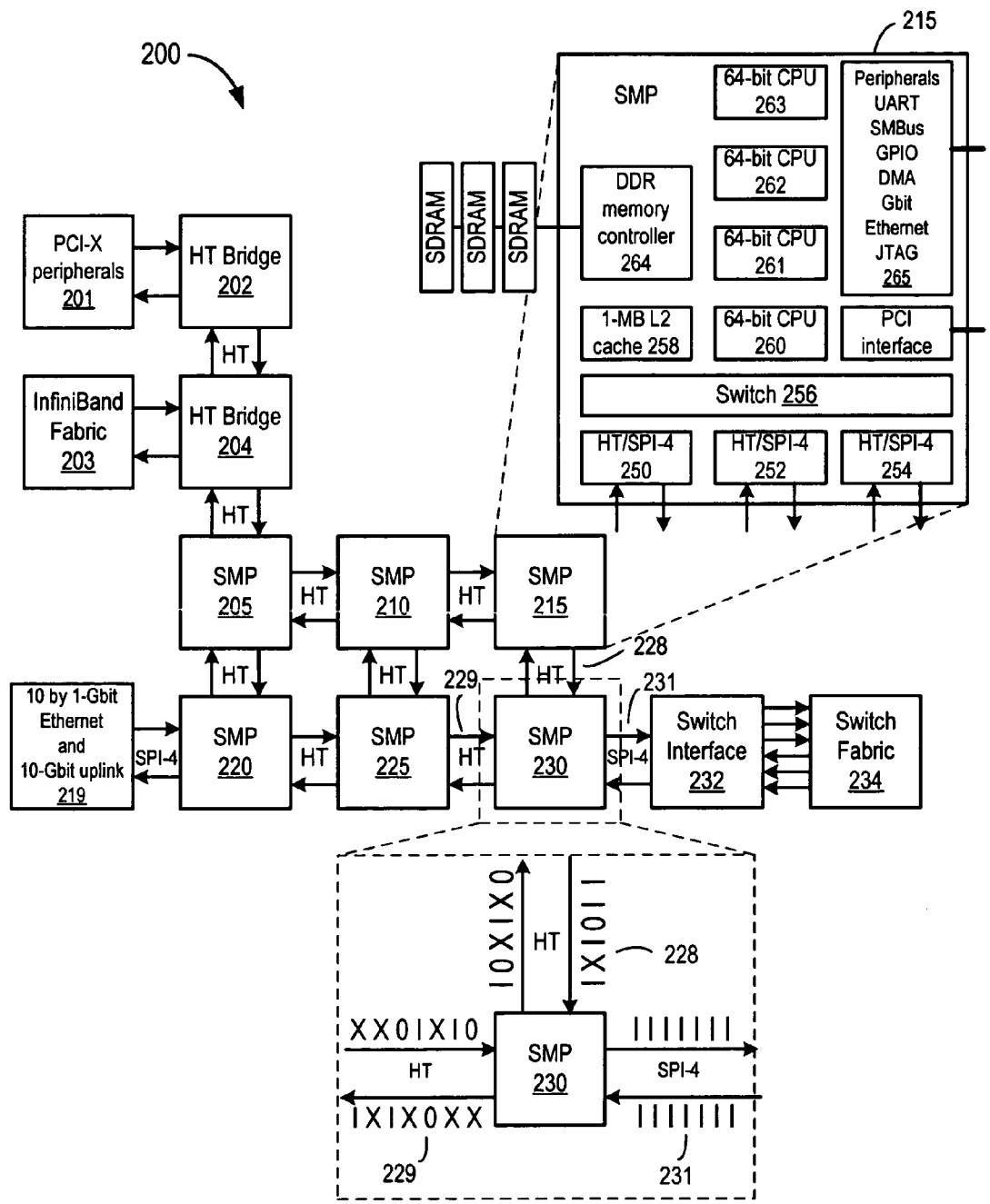
FIG. 2 depicts an example multiprocessor switch application of the present invention.

FIG. 2 depicts an example multiprocessor switch application of the present invention showing how the HyperTransport/SPI-4 link architecture can be used in communication and multichip multiprocessing support. As illustrated, each link (e.g., 250, 252, 254) can be configured as an 8- or 16-bit HyperTransport connection, or as a streaming SPI-4 interface. In addition, each link includes hardware hash and route acceleration functions, whereby routing information for an incoming packet are calculated. The routing information determines how a packet will steer through the internal switch (e.g., 256) of a multiprocessor device (e.g., 215). The destination through the switch can be either an output port or the packet manager input. Generally speaking, the steering is accomplished by translating header information from a packet (along with other input data) to an output virtual channel (OVC). In addition, the HyperTransport links (e.g., 250, 252, 254) work with a mix of HyperTransport transactions, including encapsulated SPI-4 packets and nonlocal NUMA memory access.

The multiprocessor device of the present invention (e.g., 215) includes a level 2 cache memory 258 which can be used for code prefetching that can reduce latency of the system. In a selected embodiment, a large (e.g., 1-Mbyte) level 2 cache 258 means that only small, random, nonlocal memory accesses will cause any significant slowdown. Moving large amounts of sequential memory via nonlocal memory is not a problem as only the transfer initiation incurs a latency penalty—a small fraction of the time necessary to send the block of data.

Large amounts of streaming data can also be handled when a port (e.g., 231) is set up as an SPI-4 link. This is ideal for high-speed communication environments. It can supply a link to external communication connections that have a native SPI-4 interface like Ethernet MACs 219 or to switch-fabric interface chips 232, 234.

As illustrated in FIG. 2, three HyperTransport links (e.g., 228, 229, 231) enable an expandable system. Two links (e.g., 228, 229) are needed for a pass-through architecture where multiple units (225, 230, 215) are daisy-chained together. In this configuration, the links 228, 229 between multiprocessor units carry HT I/O packets (indicated as "X" data in FIG. 2), ccNUMA packets (indicated as "0" data in FIG. 2) and/or SPI-4 packets (indicated as "|" data in FIG. 2). The pass-through architecture is ideal for processing as data moves along the chain. Unfortunately, implementing the same links for NUMA transfers will reduce the bandwidth available for other traffic. It is possible to link a pair of chips using the third link for NUMA transfers if the daisy-chained link bandwidth is needed for I/O or network packets. A third link allows the nodes in the array to extend in another direction. This can work in two ways. It can supply another path for a daisy-chain architecture. It can also provide additional processors to work on data forwarded from the daisy-chain data stream. This is great for such applications as the VPN processing that is handed off to additional processing nodes. Alternatively, when the third link (e.g., 231) is used to connect the multiprocessor unit 230 to an external switch interface 232, the third link carries SPI-4 packets (indicated as "|" data in FIG. 2).

Figure 3:
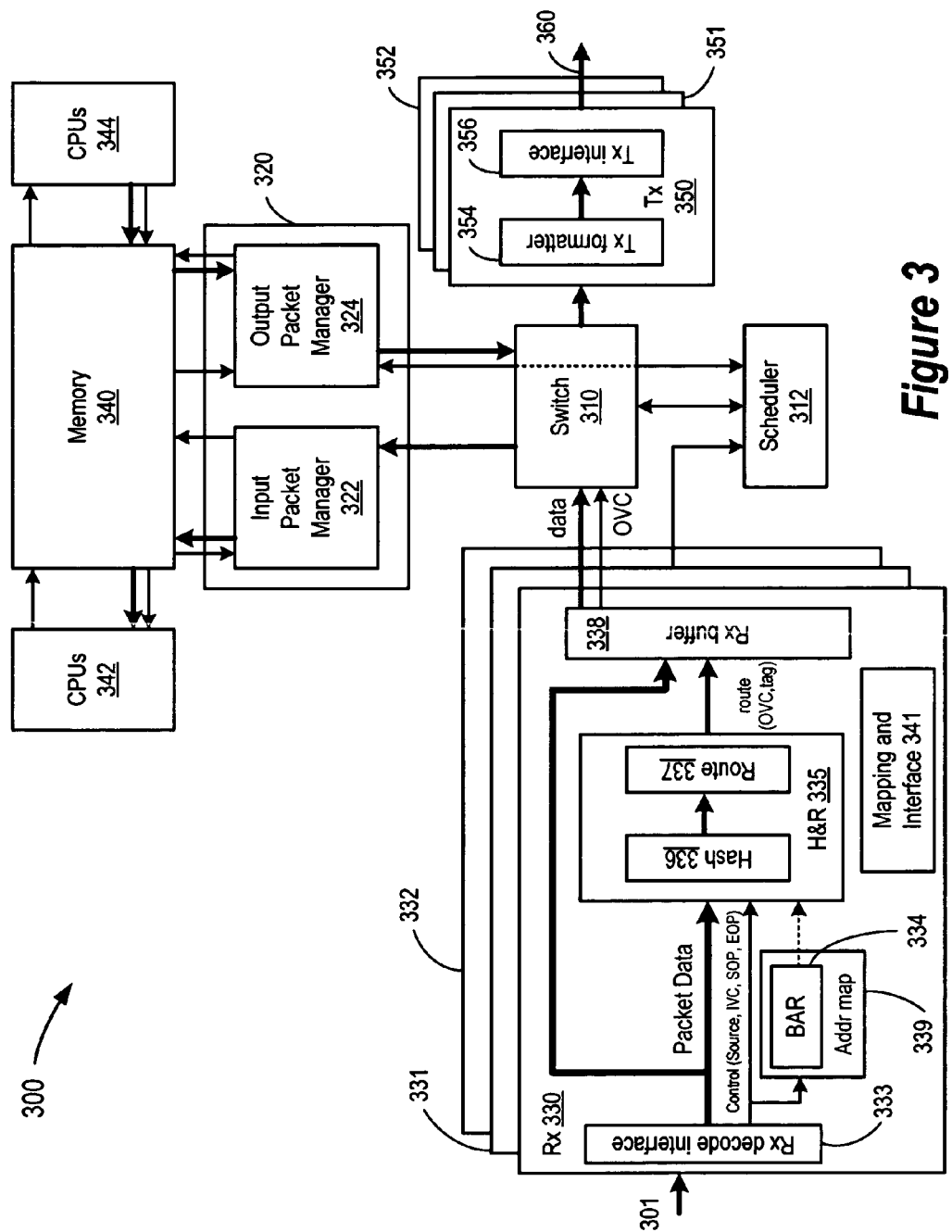
FIG. 3 depicts a receiver port with hash and route hardware for parallel routing of packets in accordance with the present invention.

FIG. 3 depicts additional selected details concerning the receiver port of the multiprocessor device of the present invention which includes hash and route hardware for parallel routing of packets. In particular, each receiver circuit 330-332 includes a hash and route (H&R) circuit 335 in the illustrated embodiment, which maps packets from the IVCs to an output virtual channel (OVC). The OVC is used as the internal virtual channel for the system 300, and in particular is used to transmit packets through the switch 310 to the packet manager circuit 320 or to the transmitter circuits 350-352. Viewed in another way, requests to transmit packet data through the switch 310 are made based on the OVC of the packet, which identifies both the destination of the packet and the virtual channel at the destination. The OVC may also be referred to herein as a destination and the virtual channel at the destination. An example of how input virtual channels are routed by the H&R circuit via OVCs to various virtual channels for input queue and transmitter destinations is depicted in U.S. Patent Application Publication No. US 2003/0095559 A1, FIGS. 2-4 and the associated description of which was filed on Oct. 11, 2002, and is incorporated herein by reference in its entirety.

As depicted, the network and system chip 300 includes an on-chip five-port switch 310 that connects a node controller (shown in FIG. 1 as node controller 134) and packet manager 320 to three high-speed transmit/receiver circuits 330-332, 350-352. Software resident in the memory 340 and processors 342, 344 may process and modify incoming packets, may require direct storage in memory 340 without modification, and may generate packets for transmission via transmitter circuits 350. The node controller manages HyperTransport (HT) transactions and remote memory accesses for the cache coherent, distributed-shared-memory model of the system. The packet manager 320 provides hardware assisted packet processing capabilities including DMA engines, channel support, multiple input/output queues, TCP/IP checksum functions, and output scheduling. The high-speed receiver and transmitter circuits can operate in one of two modes; HT or SPI-4 Phase 2. The 16-bit HT mode allows connection to companion multiprocessor devices in a daisy-chain configuration, to HyperTransport bridge chips for additional I/O devices, or to an external switch for scalable bandwidth applications. The SPI-4 mode is intended for direct connection to physical layer network devices—e.g., 10 GE MAC, OC-192 SONET framer, or to an application specific (ASIC) chip that provides customer enabled network functions.

In the embodiment of FIG. 3, the receiver circuit 330 includes a decoder interface 333 (which includes an SPI decoder and an HT decoder including a PoHT BAR register 334), a hash and route (H&R) circuit 335, a receiver buffer 338 and additional interface and mapping circuitry 341 for interfacing with the switch 310 and scheduler 312. Other receiver circuits 331, 332 may be similar. The decoder 333 is coupled to receive input data on the port 301, and is counled to provide an input virtual channel (IVC) and the packet data to the H&R circuit 335. The decoder 333 is also coupled to provide the packet data to the receiver buffer 338 for storage. The H&R circuit 335 is configured to generate an OVC and optionally a next destination (next_dest) value, which are received by the receiver buffer 338. The receiver buffer 338 is coupled to the switch 310 and scheduler 312. The H&R circuit 335 may also be coupled to a packet manager input map register 322.

The decoder 333 receives the input data from the port 301 and decodes the data according to the SPI specification (in the SPI decoder mode) or the HT specification (in the HT decoder mode). The decoding mode depends on which port 172, 174, 176 the receiver circuit 330 is coupled to, and may be selected in any desired fashion. The PoHT extension to the HT interface defines an address range (stored in the PoHT BAR register 334) to which HT sized-write commands may be directed in order to transmit packet data. The IVC may be carried in the sequence ID field of the HT packet, and selected bits of the address may indicate whether the data is the start of packet, middle of packet, or end of packet, the number of valid bytes in the last doubleword of the HT packet, and an error status. If an HT sized-write is decoded, and the address is in the address range indicated by the PoHT BAR register 334, the HT packet is a PoHT packet and the data transmitted with the sized-write is packet data.

The decoder 333 provides the IVC of the packet and the received packet data to the H&R circuit 335. The H&R circuit 335 may select bytes of the packet data and/or the IVC and generate a corresponding OVC for use by the switch 310 in routing data on the chip 300. While the H&R circuit may implement any hashing and mapping function, in one embodiment the H&R circuit may support a number of programmable rules. Each rule selects bytes from the data (or the IVC) as the packet goes by and compares the selected data to an operand of the rule. Each rule may be evaluated on packet data and the true/false results of each comparison may be input to a path table. The path table includes entries which search for selected true or false results from the rules, and outputs path data from a matching entry. The path data may be an OVC, may be an index to a route table which outputs an OVC, or may select the output of a hash function or an extract function as the index to the route table (which may optionally be added to a base address which is also part of the path data). Additionally, for HT interfaces (such as an HT switch), a next_dest value may be output which is used to indicate to a transmitter circuit 350-352 on an HT interface, which base address to select from a table of base addresses for the write command comprising the PoHT packet. If the OVC indicates a virtual channel for the packet manager input 322, the H&R circuit 335 may use a PMI map register 341 to map the virtual channel to an input queue of the packet manager input 322.

The path of a packet through the multiprocessor device 300 will now be described with reference to the network and system chip 300 depicted in FIG. 3. In this example, a packet comes into the chip through one of the receiver ports (e.g., 301), reaches software, is potentially modified, then sent to another chip through a transmit port 360.

Packet Reception

1. The packet 301 arrives through one of the three receiver interfaces 330-332 of the chip. The receiver interface (e.g., 330) can run in either SPI-4.P2 mode (native packet mode) or in HyperTransport (HT) mode, in which case, it uses a special extension called Packet-over-HyperTransport (PoHT) to transfer the packets. From a logical perspective, both modes provide almost identical services. The receiver interface 330 deals with the specifics of the protocol and converts the control and data streams 301 into an internal packet format for the chip.

2. The packet control and data streams are sent to the hash and route (H&R) block 335, which includes a hash 336 and route 337 functionality. The purpose of the hash block 336 is to extract fields from the packet (specific parts of the headers usually) and hash them if necessary. The hash block 336 provides a small signature of the packet to a route table 337. In accordance with the present invention, hashing is completely optional, can consist of the simple extraction of a byte from the packet, or can be any technique or algorithm that turns a variable-sized amount of text into a fixed-sized output (hash value).

3. The route block 337 takes parameters from the packet (such as the result of the hash and the input virtual channel the packet came in on) and looks up in a table to figure out where exactly the packet will go. Not only is the destination block determined (transmitters 350-352 or packet manager input (PMI) 322), but block-specific values like the virtual channel (for a transmitter) or the input queue (for the PMI) are also output from the route block 337.

4. While the packet is hashed and routed, it is also stored in the receiver buffer 338, which may be a large (e.g., 16 KB) buffer. The stored packet data will stay there until a routing decision has been made and it is scheduled to its destination block. In accordance with the present invention, the packet does not need to be entirely stored in the buffer 338 before being sent to its destination. For example, if the routing has been determined early, the first (e.g., 16 byte)

chunk of data can be sent as soon as a threshold amount of bytes of the packet has been gathered.

5. As soon as a chunk of data from the packet is ready to go, the receiver interface (e.g., 330) sends a request to the switch scheduler 312. When the chunk can be scheduled, the scheduler 312 applies the required changes to the switch 310 and informs the receiver buffer 338 that it can start transmitting.

6. The receiver buffer 338 sends the chunk of data to the switch 310 and frees up the buffer space for more incoming packet data.

7. In this example, the routing table 337 has determined that the packet should be sent to the packet manager 320 to be processed by software. The input packet manager (PMI) portion 322 receives the packet data from the switch 310. A specific input queue (IQ) of the PMI 322 is chosen for the packet by the H&R module 335.

8. To know where to put the packet data, the PMI 322 reads one or more descriptors from main memory 340 (or from L1 or L2 caches or from a remote note). The descriptors contain the address and sizes of data buffers set aside by software to be used for incoming packets. They are also used as a synchronization mechanism between hardware and software.

9. As soon as the PMI 322 has a buffer to put the packet data into, it starts streaming the data to the memory 340 through the system bus. Once again, the final storage might be in a cache or in main memory.

10. When the PMI 322 is done with the packet, it writes back information about the packet in the descriptor(s) to tell the software that it is done with the packet and communicate some information about the packet (like its size).

11. The software typically waits (e.g., spins) on the descriptors in the various queues and as soon as one is marked ready by the PMI 322, it reads it. It can also be interrupted by the PMI 322 when a new packet arrives. It can also read the current pointer of the PMI 322 for a particular IQ.

12. The packet data is typically read, at least in part, by the software to figure out what to do with it. There is no particular constraint on which CPU 342, 344 deals with which IQ. There must just be some synchronization between the CPUs if IQs are shared.

Software Background Tasks

13. In the background, software finds free data buffers (typically recycled from packets just transmitted from an output queue (OQ)) and updates the descriptors in the IQs to provide the PMI 322 with storage for future packets. The software also updates a count field in the PMI 322 to tell it the number of new descriptors added.

14. As in the previous step, the software needs to reclaim output queue (OQ) descriptors that have been processed by the output packet manager (PMO) in order to free the data buffers and potentially use them for IQ descriptors.

Packet Transmit

15. When the software wants to send or forward a packet (e.g., from CPU 344), it needs to write it into a buffer in memory 340. Depending on the source of the packet data (higher-level software, fragments of input packets . . . ), the software might need to fully copy or create the packet data, modify it or leave it as is.

16. When the packet data is ready, the software will write one or more descriptors in the output queue (OQ) of the PMO 324 that has been chosen for the packet. The descriptor(s) contain essentially the address of the buffer where the packet fragments can be found and their size.

17. The PMO 324 waits for descriptors to be ready for transfer in the OQs. The software writes to a special register in the PMO 324 every time it adds new descriptors to be transmitted. Descriptors are read by the PMO 324 to extract the relevant information.

18. When the address where the packet resides at in memory 340 is known to the PMO 324, through the descriptor(s), the PMO 324 starts reading the address. The PMO 324 has a large output buffer equivalent to the receiver buffer 338, which is used to prefetch outstanding packet chunks, waiting for them to be scheduled for transmission.

19. PMO 324 writes the descriptor(s) back to memory 340 when the data associated with each descriptor is completely placed in the output buffer.

20. Each OQ in the PMO 324 sends all of its packets to the same internal destination (block, virtual channel). However, different OQ's can have different destinations. Accordingly, as soon as the PMO 324 has a full chunk of data available, it sends a request to the scheduler 312, much like the receiver interface does in step 5, to get the chunk scheduled to its destination. The scheduler 312 arbitrates between the many requests and when a chunk is scheduled, it changes the connections in the switch 310 and informs the source (the PMO 324 in this case) that it can transmit the chunk.

21. As soon as the PMO 324 gets a grant from the scheduler 312, the PMO 324 transmits the corresponding chunk of data to the switch 310. The PMO 324 can then free and reuse the allocated storage in the PMO buffer.

22. The switch 310 forwards the chunk of data to the final destination, such as a transmitter 350 in this example, as indicated by the scheduler 312.

23. Just like the receiver interfaces, the transmitters 350-352 can run in SPI-4 or HT mode. The transmitter formatter 354 will take the incoming packet data chunks from the switch and will format them according to the mode it is configured in. While the PMO 324 has enough storage to cover the round-trip latency to main memory, the transmitters 350-352 provide minimal buffering (4 KB) required to assemble outbound bursts of data on the high-speed links. In a selected embodiment, all data transmits thorough a 4 KB transmit buffer.

As will be appreciated, packets can go through the switch 310 without touching memory 340 and CPUs 342, 344 (skipping steps 7 to 21). Packets can also be sinked by software and not be forwarded (skipping steps 14 to 23) or sourced by software directly (skipping steps 1 to 13).

In a selected embodiment, each VC is independently flow-controlled so that if one VC is blocked, the other ones can still flow through. This way, there is no head-of-line (HOL) blocking due to the congestion of a flow. In addition, the flow of packets is controlled so that packets on the same VC travel one after the other, and fragments of different packets cannot be interleaved within the chip 300. By including start of packet (SOP) and end of packet (EOP) signaling in the control signal, the receivers can differentiate between the packets, even when packets of different VCs are interleaved on the input and output ports, depending on the unit of transfer on the underlying physical channel. In SPI-4 mode, each high-speed receive/transmit port (e.g., 162 in FIG. 2) supports multiple (e.g., 16) VCs with independent, calendar-based flow control. In HT mode, each high-speed receive/transmit port uses a special extension to the regular HT protocol called Packet-over-HyperTransport (PoHT) which emulates the functionality of the SPI-4 interface, providing multiple (e.g., 16) independent channels per port (in addition to the regular, non-packet HT and HTcc VCs).

In accordance with the present invention, the hash and route (H&R) block 335 makes all of the routing decisions for ingress packets from the high-speed receiver ports 330-332 by calculating, for each packet, an output virtual channel (OVC) which is used for internal switching on the multiprocessor device 300. The packets are then sent to either the packet manager input (PMI) 322 or to one of the transmit ports 350-352. The H&R module 335 is located in each of the three high-speed receiver ports 330-332. As a packet 301 enters the receiver port (e.g., 330), it is decoded and control information is extracted by the receiver interface or decoder 333. The H&R module 335 calculates the routing result by using this control information along with the packet data and several programmable tables in the H&R module 335. Routing information is encoded in the form of a switch or output virtual channel (OVC) which is used by the on-chip switch 310 to route packets. The OVC describes the destination module, such as the PMI 322 or transmitter ports 350-352, and either the input queue (IQ) number in the case of the PMI or the output channel in the case of the transmitter ports. When targeting the packet manager 320, the output virtual channel corresponds directly to IQs. On the output side, the packet manager 320 maps an OQ into one OVC which always corresponds to a transmitter port. In addition, multiple sources can send packets to a single destination through the switch. If packets from different sources (receivers 330, 331, 332 or PMO 324) are targeted at the same output VC of a transmitter port or the IQ of the PMI 322, the switch 310 will not interleave chunks of packets of different sources in the same VC. Both the packet data and its associated route result are stored in the receiver buffer 338 before the packet is switched to its destination.

The H&R module 335 can route based upon the full 8-bit input virtual channels (IVC) field of the SPI-4 control word. In the embodiment depicted in FIG. 3, the only control information that transmits as address information on the SPI-4 wires and is extracted by the receiver interface 333 is the IVC used for the packet. Alternatively, SPI-4 has an optional provision for extended addresses that can be used for routing. The H&R module 335 uses the packet data and the IVC to make a routing decision. For transmission, the transmitter port (e.g., 350) acts as a SPI-4 encoder, requiring as inputs only the OVC for the packet and the data itself. The OVC is taken from the output of the H&R module 335 or from the PMO 324, depending on the source of the packet.

The H&R module 335 may also support Packet-over-HyperTransport (PoHT) mode, so packet data encapsulated in HyperTransport transactions can also use the H&R module 335. PoHT routing is slightly more complicated than SPI-4 routing, as, in addition to an IVC input to the H&R module 335, there is also an HT address input traveling with each fragment. The HT address and other fields must be used and interpreted by the decode logic. As will be appreciated, the IVC travels in a special field in the packet 301, and corresponds to one of the extended HT IVCs provided for PoHT. Additional control bits extracted from the packet 301 are used to indicate SOP, EOP and the fragment size. Extra bits can also be used to encode "source" control information, as described below. To implement the model of hop-by-hop routing using the H&R module 335, the PoHT model uses HT as a local transport between direct neighbors. Each chip uses a different PoHT address range, allocated using the standard HT configuration mechanism. The PoHT address range is decoded with the base address register (BAR) 334. (A BAR is a PCI/HT concept that describes a relocatable range of memory for I/O devices.) As shown in FIG. 3, every HT transaction is decoded by the address map block 339. If the HT transaction matches the BAR 334 range, then it is sent to the H&R module 335 and processed as a packet. Otherwise, the transaction is decoded as an HT or HyperTransport Cache Coherent (HTcc) command. PoHT traffic cannot hop over a chip, but is obliged to go through H&R module 335 at every hop, just as it does in SPI-4 mode.

On the transmit side, the H&R module 335 or the PMO generates a "next_dest" index as an input to the transmitter port (e.g., 350). The "next_dest" index is used as an input to a PoHT lookup table (not shown) in the transmitter to choose between a small number of addresses that can be used as the HT destination address for the fragment. In a typical use, for a given port, only one address should be used, the PoHT address of the chip directly connected to the transmitter port (e.g., 350). The reason why "next_dest" exists and is an index in a table, instead of using a static address value (the PoHT address of the neighbor) is to support HT switches. Using "next_dest," it is possible to designate any of the chips hooked to an HT switch as the target for the packet. This solves the problem of the lack of H&R function in the external switch. In essence, the routing table of a particular chip actually extends not only to neighbors but also to indirect neighbors through a switch. The number of entries in the address table limits the number of ports that can be addressed by a particular transmitter port 350-352. The table in a particular transmitter is only related to other devices on the ports of the switch it is connected to.

FIG. 3 shows the inputs and outputs of the H&R module 335. As depicted, the packet data extracted or decoded by the receiver interface 333 can be used by the hash module 336 to either extract a specific value or hash several fields to compute a special value. The packet data includes all headers (L1-7) and payload. In addition, the input virtual channel ("IVC") to the H&R module 335 is used to potentially apply different routing decisions to packets on different VCs. The input source field ("source") may be used when a HyperTransport switch has been crossed to identify packets from different sources that might be interleaved in the same virtual channel. In addition to these inputs, the H&R module 335 receives the notification of start-of-packet (SOP), end-of-packet (EOP) and fragment boundaries as control data inputs.

The H&R module 335 keeps track of the outstanding packet in each IVC. In a selected embodiment, the H&R module 335 can route interleaved packets from different IVCs, with multiple (e.g., sixteen) IVCs being processed together by storing the results of the hash and route operation for each IVC so that the results can be updated with the next packet on each IVC. For a given H&R module, if packet data is used to make the routing decision, all outstanding fragments are kept in a temporary buffer until a decision can be reached. Once a routing decision is reached, it is stored and applied to all subsequent fragments of the same packet. In this way, multiple interleaved packets of different channels can be simultaneously processed and routed by tracking the hash and route results for each channel. When packets from different sources are interleaved by a non-packet-aware switch (like an HT switch), it is possible to get interleaved packet fragments on the same IVC. In this case, packet data should not be used for routing, and the routing decision is made for every fragment, regardless of packet boundaries. If the system carries only short packets (i.e., 64B or less for HT), it is also possible to make a decision based on packet data, as packets span a single fragment and therefore cannot really be interleaved.

The routing decision is contained in several outputs from the H&R module 335. For example, the output virtual channel output (OVC) may specify a destination block ("dest block") that is one of the transmitter ports 350-352 or the PMI 322. This output tells the switch 310 where the packet needs to be forwarded. This is the only field that is used exclusively by the switch 310 and is not sent with the packet to the destination block. Depending on the destination block, the OVC/IQ output gives the index of the OVC (when a transmitter port is the destination block) or IQ (when the PMI 322 is the destination block) targeted by the packet. In addition, a "tag" output may be used by the transmitter port (e.g., 350) in HT mode to hop over a switch and reach any of a certain number of targets on ports of the switch cloud. The "tag" output is interpreted as a "source" or "IVC" field by the PMI 322 to differentiate between interleaved fragments of the different packets going to the same IQ.

As described herein, the H&R module 335 can be programmed for a variety of applications and can be used as a routing, flowsplitting or load balancing function. A few exemplary intended routing uses include:

(1) Route on VC: Packets go to a particular destination based solely on the IVC input to the H&R module 335. Usually, the OVC would be kept the same. If the packet is to be sent to the PMI 322, however, it might have to be distributed like in method (4) below.

(2) Route on Layer 1 (L1): The H&R module 335 uses a particular field in a pre-L2 header that is system-specific and performs a table lookup to find the desired destination. Packets going through usually keep their VC.

(3) Route on L2/L3: Using a compare and match functionality in the hash module 336, the H&R module 335 matches address, protocols and other useful fields against a particular pattern. If a match occurs, the packet is typically routed to a particular IQ.

(4) Distribute using flow-splitting: Packets are hashed so that packets from the same flow will end up with the same hash value. With this routing, multiple flows can have the same hash value. While a variety of hashing techniques could be used, in a selected embodiment, hashing could be done on TCP/IP 5-tuples, whereby five fields are hashed to determine if the packets are related. A lookup table is used that contains a destination (typically an IQ) for each hash value. By tuning the assignment of IQs to hash values, it is possible to achieve some reasonable load balancing. The routing table should not be changed by software while packets are being received unless the software can identify which packets were routed according to the old versus the new values.

In accordance with the present invention, several or even all routing kinds might be active at the same time. For example, packets on certain channels can be passed through using "Route on VC" (type (1) routing), such as where the packets are outbound packets and will eventually reach the backplane. Packets on other channels can be routed using a L1 header (type (2) routing), such as with inbound packets that have been distributed by an upstream ASIC. If a packet needs to go to an IQ, it could be matched against some patterns and go to a specific IQ if it hits (type (3) routing), such as when route updates or control packets addressed to the node need to be extracted. For other standard packets going to an IQ, the hash distribution method could be used to load balance the flow distribution between CPUs (type (4) routing). The foregoing illustrates the behavior of a sample system that gets data through an upstream ASIC, sinks some packets, produces others and tries to load-balance the distribution of incoming packets to the CPUs.

The purpose of the hash block 336 depicted in FIG. 3 is to combine the inputs of the H&R module 335 and to reduce them to a small quantity that can be looked up by the routing block 337. Persons skill in the art will appreciate that any of a variety of different methods and algorithms can be used to achieve this hashing function.

In accordance with the present invention, the hashing and extractions can span only a limited number of bytes in the packet because all previous fragments are stored and cannot be routed until a decision is made.

The route block 337 may be implemented as a single look-up table, or as a plurality of tables, to return a routing decision based on an index given by the hash block 336. An example of a routing table set forth at Table 1:

TABLE 1

| Destination | OVC | tag |
|---|---|---|
| Tx0, Tx1 . . . | SPI/PoHT VC | next_dest |
| PMI | IQ | source or IVC |

As shown above, the routing table contains several fields that are to be transmitted to the switch 310. The destination field is used internally by the switch only and not transmitted to destination blocks. The meaning of the other fields is destination-block-dependent. The OVC field can be a different number of bits for the PMI 322 (IQ number) and the transmitter port (HT/SPI VC number). The tag field also has different meanings, such as "next_dest" for a transmitter port, or it can be either source or IVC for the PMI 322.

The values in the table can be changed by the software while the system is running. This is useful in particular when the flow-splitting distribution scheme (described above) is used and each entry in the table determines the destination IQ for a particular hashed flow value. For load balancing purposes, it might be useful to change the IQ assignment of some of the flow hash values. In a selected embodiment, statistics on packets and table entry hits can be maintained and used for load-balancing.

Figure 4:
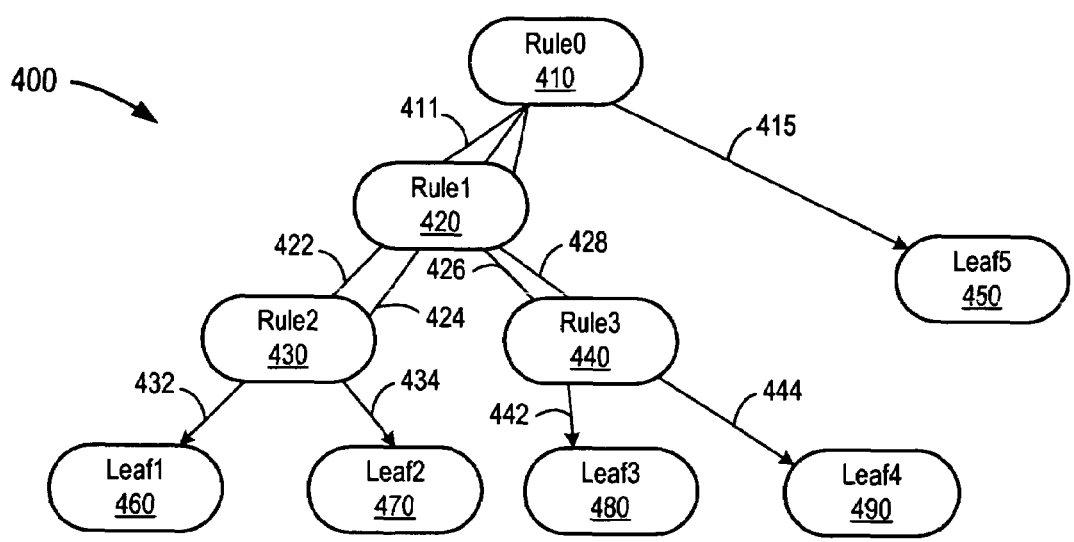
FIG. 4 illustrates an exemplary hash and route programming model for use in connection with the present invention.

The H&R module 335 described herein can be used to implement a variety of parallel routing schemes for directing packet data to predetermined and programmable destinations. In a selected embodiment, one programming model for the H&R module 335 is a decision tree 400 with nodes (e.g., 420), paths (e.g., 415), and leaves (e.g., 450), an example of which is depicted in FIG. 4, which illustrates an exemplary hash and route programming model for use in connection with the present invention. The interior nodes of the tree (410, 420, 430, 440) represent decision points, called rules, which extract fields from the packet. These fields are compared with operands specified in each rule. All of the rules operate independently, in the sense that no rule requires earlier state information, such as conventionally used with state machine solutions. Thus, instead of following the conventional state machine approach to the decision tree (which can be problematic when a subsequent state relies on a bit or field from the packet that has already passed by), the H&R module of the present invention determines all rules and leaves simultaneously and in parallel so that the outcomes are available for selection at the end of the tree.

Because the rules are evaluated in parallel as the packet goes by, a programmable or variable offset approach cannot be used in the rules, which would be useful with Ethernet VLAN packets where the header affects the position of the IP field in the packet. Instead of using an offset, two rules are implemented in the H&R module where one rule applies to the VLAN packets and the other rule matches non-VLAN packets.

As will be appreciated, the decision tree 400 can be arranged in various shapes, ranging from a linear sequence of rules to a fully-balanced tree with sixteen leaf nodes. The mechanism that determines the shape of the tree is called a path table which determines the different paths (e.g., 411, 422, 432) over which a packet can traverse the tree 400. When a packet reaches a leaf node (450, 460, 470, 480, 490), the route calculation is performed and no other rules need to be applied. Thus a leaf node specifies the routing result of the H&R module 335. As will be appreciated, the rules can also be arranged as separate (independent) decision trees.

In connection with the present invention, there are multiple methods for specifying a leaf node or routing result. For example, the path can be used since the path can describe a unique leaf in the decision tree. In one method, the path description is used to obtain an immediate value which is used as the OVC. Alternatively, a path entry can be used to specify an index into a route table which has OVC entries. In addition, a path description is used to specify a hash leaf which provides a mechanism to extract bytes or fields which can be hashed and folded down to a key that indexes into a route table. Another method defines an extract leaf which can extract nibbles from either the packet data or the IVC to form an index into the route table.

In the example of FIG. 4, there are four rules, and five paths. As was mentioned earlier, the rules are the vertices, and the paths are the head-to-leaf trails through the tree. The rule configuration table would look like Table 2:

TABLE 2

| Rule # | Source Select | | | Function | | |
|---|---|---|---|---|---|---|
| | Type | wordcount | enable | Op | Alu | Description |
| 0. | info | — | — | 2 | xnor | IVC == 2 |
| 1. | data | 2 | 0x00ff0000 | 4 | xnor | IPV == 4 |
| 2. | data | 2 | 0x00ff0000 | 6 | xnor | IPV == 6 |
| 3. | data | 1 | 0x0000ffff | 0 | xnor | flags == 0 frag-offset=0 |
| 4.-15 | — | — | — | — | — | unused |

In this example, the Path Table configuration table for our example would be set forth in Table 3 below, which defines Path 1 (path elements 411, 422, 432 in FIG. 4), Path 2 (path elements 411, 422, 434 in FIG. 4), Path 3 (path elements 411, 426, 442 in FIG. 4), Path 4 (path elements 411, 428, 444 in FIG. 4) and Path 5 (path element 415 in FIG. 4):

TABLE 3

| Path # | Rule(0) | Rule(1) | Rule(2) | Rule(3) | Rules(4-15) | R_type | R_data |
|---|---|---|---|---|---|---|---|
| 1. | 0 | 0 | 0 | x | x | OVC | PMI, IQ5 |
| 2. | 0 | 0 | 1 | x | x | Leaf | HF1 |
| 3. | 0 | 1 | x | 0 | x | OVC | PMI, IQ4 |
| 4. | 0 | 1 | x | 1 | x | leaf | HF2 |
| 5. | 1 | x | x | x | x | SCV | TX2, port2 |
| 6. | x | x | x | x | x | OVC or invalid | OVC0 or dont_care |

As this is an implementation of a binary decision tree such as depicted in FIG. 4, the rules-all-match should occur at one entry and one entry only. This means that there is no need to recognize the presence of unmatches in the entries of higher priority when evaluating a rules-all-match. When there is no match or multiple matches, this may optionally be reported as a programming error, or may be resolved using the prioritized table entry method described below. Entries with all Xs in the rules are invalid or used as the default entry if the R_type field is coded non-invalid. It must be at the top of them (Path# 6 above).

Alternatively, when two paths return "true" results, the priority may be resolved by taking the first path listed in the table, although sufficient time must be allowed to wait for all decisions to be made. Similarly, when multiple rules match, priority can be resolved by taking the most specific address as the outcome. For example, rule priority may be awarded based on the "longest prefix match" of the IP addresses. In resolving path table priorities, this can be accomplished by requiring that the longest prefixes be listed first in the path table. If this multiple match prioritization technique is not used, the software can also request logic to report a programming error.

One interesting thing to note is that some paths can evaluate to "unmatch" faster than they can evaluate to "match" because the former requires just one rule False, whereas the latter requires all rules True. An example is that if the incoming packet has IVC=2, paths 1-4 will immediate return "unmatch" (since rule #1 will return True). It will be some time (based on data in rules 2-4) before they could possibly return matches. Thus ordering in the path table is not significant as long as the path table is configured correctly like in the example path table above. The order in the path table is used to resolve the priority of multi-paths that simultaneously become selected by rules which only occurs by a wrong setting.

Figure 5:
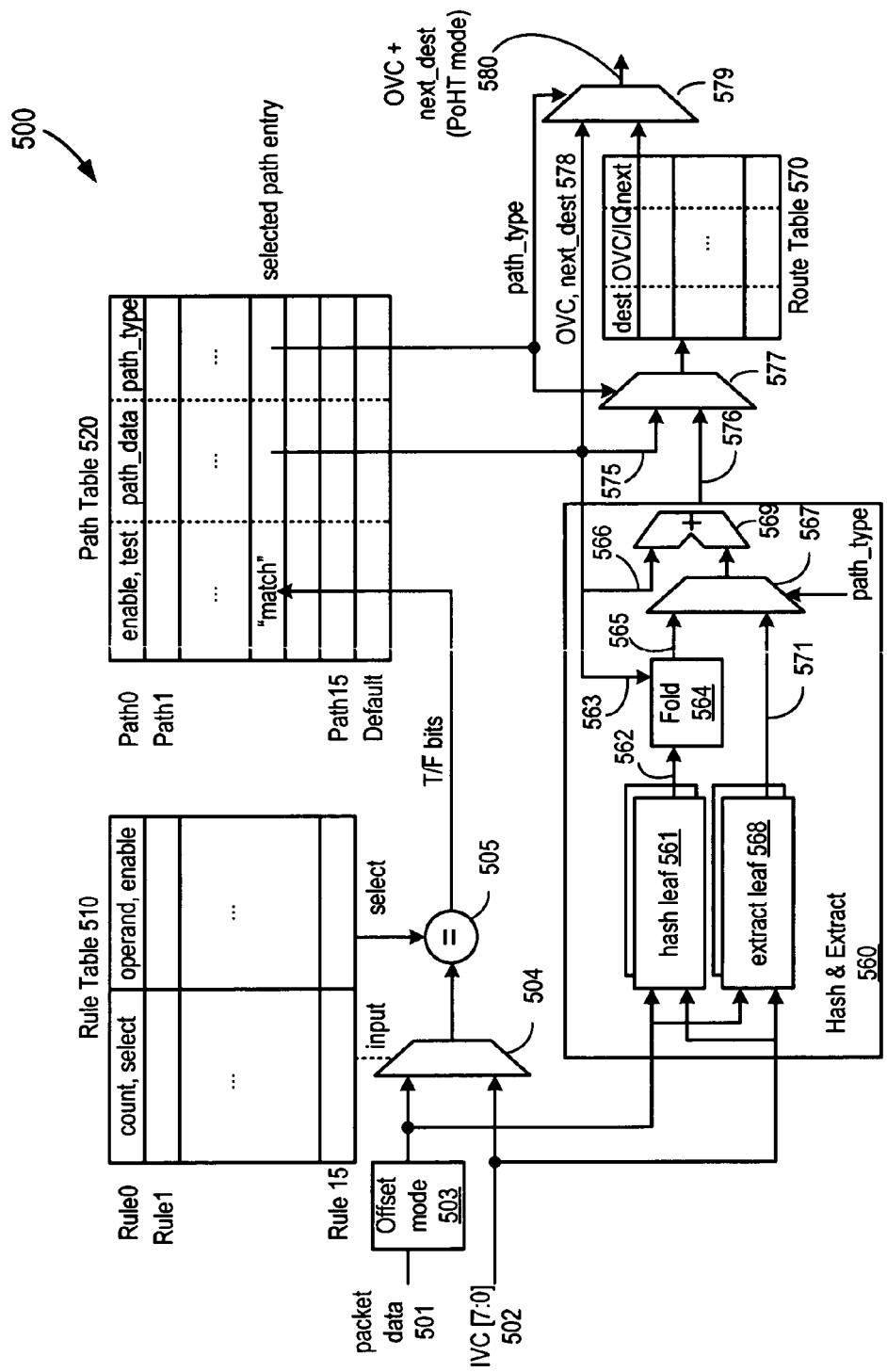
FIG. 5 illustrates a block diagram of one embodiment of a hash and route circuit in accordance with the present invention.

Turning now to FIG. 5, a block diagram of one embodiment 500 of the H&R circuit 335 is shown. In the embodiment of FIG. 5, the H&R circuit 500 includes a rule table 510, a path table 520, a route table 570, an offset circuit 503, a select logic circuit 504, a compare logic circuit 505, a hash circuit 561, an extract circuit 568, a fold circuit 564, a multiplexer (mux) 567, an adder 569, a mux 577, and a mux 579. The offset circuit 503 is coupled to receive packet data 501 and has an output coupled to the select logic circuit 504, the hash circuit 561, and the extract circuit 568. The IVC 502 corresponding to the packet data is provided to the select logic circuit 504, the hash circuit 561, and the extract circuit 568. The select logic 504 is coupled to the rule table 510 and to the compare logic circuit 505, which is also coupled to the rule table 510 and to provide a result to the path table 520. The path table 520 is coupled to the muxes 567, 577, and 579, the adder 569, and the fold circuit 564. The mux 579 is coupled to the route table 570. The mux 579 is further coupled to provide the OVC and optional next_dest output 580 of the H&R circuit 500. The route table 570 is coupled to receive an index from the mux 577, which is also coupled to the adder 569. The adder 569 is coupled to the mux 567, which is coupled to the fold circuit 564 and the extract circuit 568. The fold circuit 564 is coupled to the hash circuit 561.

Generally, the rule table 510, the path table 520, and the route table 570 may comprise memories which are programmable by software to generate OVCs for packets in accordance with the above. In one implementation, the entries of the rule table 510, the path table 520, and the route table 570 may be mapped into the address space of the system 30 as configuration registers which may be read and written by software. If none of the paths are "true," a "default" outcome path is provided to allow the CPU to decide the routing result.

Each entry of the rule table 510 includes an offset (count) and select field, and an operand and enable field. The offset field specifies the offset of a word (4 bytes, in one embodiment) in the packet 501 that is to be compared to the operand in the operand field. The enable field is a bit vector used to mask the selected word prior to the comparison. The select field selects either the word specified by the offset or the IVC for comparison. The select logic circuit 504 is coupled to receive the offset and select fields from each entry and is configured to select the specified data from the packet data 501 or IVC 502 for comparison. The select logic circuit 504 may select data independently for each entry and provide the data to the compare logic circuit 505. The compare logic circuit 505 may independently compare each selected data (masked by the enable field of the corresponding rule table entry) to the operand from the corresponding rule table entry. The results of the comparisons are provided to the path table 520. The results may include an indication of whether each comparison resulted in a true or false outcome. The number of entries in the rule table 510 may vary from embodiment to embodiment. In a selected implementation, there may be 16 rule entries allowing up to 16 programmable rules.

In one embodiment, the offsets specified in the rule table 510 are relative to a programmable offset from the beginning of the packet data 501. The offset circuit 503 may offset the packet data 501 by the programmable offset. In one embodiment, the programmable offset may be direct (i.e., the programmed value may be the offset). In another embodiment, the programmable offset may be indirect (i.e., the programmed value may identify an offset field within the packet data that carries the offset for a given packet). In still another embodiment, the programmable offset may be programmable to be either direct or indirect. With the programmable offset 503, the H&R circuit 500 can accommodate both immediate and indirect header alignment modes. In immediate mode, the H&R circuit 500 uses a pointer value to identify the "start-of-header" location in a received packet, such as by specifying a byte-offset in the packet that may also be added to the word count values in the rule and leaf definitions. This allows the user to specify a relative byte-offset in the packets where the H&R rule and leaf definition are applied.

In indirect mode, the H&R circuit 500 uses a pointer value as a pointer to an offset pointer within the packet. When the offset pointer is located within the first 16 bytes of the packet, the pointer value can be represented by a four-bit value. In this mode, the start-of-header may be defined as "pointer value+offset pointer."

The programmable offset mode and pointer values may be stored in a configuration register for the H&R circuit 500. A header start location within a packet can be pointed to with either the immediate or indirect modes; however, an advantage of the indirect mode is that each packet can point to a different start-of-header location where the H&R starts to decode the header.

The path table 520 may comprise a set of entries, each of which includes an enable and test field, a path data field, and a path type field. The enable and test field is used to program which results from the compare logic circuit 505 are used to determine if the path entry is used for this packet (via bits in the enable field corresponding to each result) and the test value may indicate whether the corresponding result is tested for true or false. If each enabled result tests the same as the test value specifies, the path table entry is selected. The path table 520 outputs the path data and path type fields from the selected path table entry. The path type field indicates one of several path types, controlling the muxes 567, 577, and 579 and indicating the nature of the path data. In an immediate path type, the OVC and optional next_dest 578 are specified in the path data. For the immediate path type, the path type signal selects the path data 578 through the mux 579. If the path type is not immediate, the output of the route table 570 is selected through the mux 579. Any number of path table entries may be supported in various embodiments, including different numbers of entries than the number of rule table entries. In one implementation, the path table 520 may include 16 entries and an addition default entry that is selected if none of the other 16 entries match the result of the compare logic circuit 505.

The route table 570 includes several entries, each storing an OVC and a next_dest value. The route table 570 receives an index generated in several possible fashions, depending on the path type field received from the path table 520. If the path type is an index path type, the path data 575 is an index into the route table 570 and the path data 575 is selected through the mux 577. Otherwise, the output 576 of the adder 569 is selected through the mux 577 as the index to the route table 570.

In the remaining path types, the path data may include a base address 566 used (by adder 569) to generate the index of the route table 570. In a hash path type, the output of the hash circuit 561 (a hash value) is added to the base address 566 to generate the index (and is selected through the mux 567 to the adder 569). The hash circuit 561 may be programmed to select up from multiple (e.g., 10) words from the packet data 501, mask the words with programmable enable vectors, and hash them to produce the hash value. In one embodiment, there are 512 entries in the route table 570. In such an embodiment, the hash function may generate an 8 bit hash value 562 (to be added to a base address 566 of, e.g., 9 bits, at the adder 569). Additionally, in some embodiments, the path data from the path table 520 may include a fold control 563 which folds the hash value to a smaller value (e.g., programmably 7 bits or 6 bits in one embodiment) to reduce the portion of the route table 570 selectable via the hash circuit 561. In one implementation, the hash function bitwise XORs the upper two bytes and lower two bytes of each word to produce two bytes, then XORs adjacent sets of two bits to produce one byte (8 bits). The bytes resulting from each word may be bitwise XOR'd to produce the hash value. The optional folding may XOR bits 7 and 5 of the hash value (numbering bits 7 to 0 from most significant to least significant) to produce bit 5 of the fold, zero bit 7, and provide the remaining hash value bits unmodified to produce a 7 bit fold, in one embodiment. To produce a 6 bit fold, one implementation may XOR bits 7 and 5 of the hash value to produce bit 5 of the fold, XOR bits 6 and 4 of the hash value to produce bit 4 of the fold, zero bits 7 and 6, and provide the remaining hash value bits unmodified to produce a 6 bit fold. If folding is not selected, the fold circuit 564 provides the unmodified hash value 562 as the output 565. In other embodiments, two or more hash functions may be independently programmable in the hash circuit 561, and may be selected using the path type field from the path table 520.

The extract circuit 568 may be programmable to select two nibbles (4 bits) from the packet data 501 to produce an input 571 (e.g., 8 bit input 571) to the adder 569. The two nibbles may be programmed independently and thus may be non-consecutive in the packet. In other embodiments, two or more extract functions may be programmed into the extract circuit 568 and selected using the path type field from the path table 520. In other embodiments, the extract result may be folded in a manner similar to the hash value.

While the embodiment of FIG. 5 provides a variety of mechanisms for generating an OVC output 580, other embodiments may provide any subset of one or more of the direct OVC generation, the index from the path table to the route table, the hash mechanism, or the extract mechanism. Any size route table may be supported, and thus the hash value and extract result sizes may be varied.

The operation of the hash and route circuit 500 depicted in FIG. 5 will now be described with reference to the exemplary hash and route programming model depicted in FIG. 4. Each H&R module 500 contains sixteen rules that are arranged in a rule table 520 and are accessed as control and status registers (CSRs). Each rule can extract a byte or word from the packet 501 and compare it at comparator 505 with an operand value stored in the rule table 510. This allows for simple decode of header fields of a packet. A rule can also compare the IVC (Port Address) 502 with the least significant byte of the operand to allow for routing decisions based solely upon IVC. However, only one of the operand or IVC modes is supported at a time per rule. A rule can also selectively enable individual bits for comparison. If the two values are equal, then a true (T) status is sent to the path table 520, otherwise a false (F) status is sent. All rules simultaneously send their output values to the path table 520 for parallel evaluation.

The configuration status registers related to the rule table 510 include sixteen operand registers and sixteen rule registers. The operand registers contain an operand (operand) and an enable bit vector (enable) used as the immediate value in the comparison operation. The rule-type registers contain an offset value (count) that is used to identify the word to compare, and a rule type field (select) which determines if the operand is compared with packet data or the IVC. The offset value is relative to a "start-of-header" position in the packet which is defined by the user.

The path table 520 contains multiple path entries representing all of the leaf nodes of the decision tree (tree 400 shown in FIG. 4). Each path entry represents a single path through the decision tree (starting from the head and ending at a leaf). The path table 520 consists of two enable and T/F vectors, called enable and test. These bit vectors correspond to the sixteen rules described above. If the corresponding enable bit is set, then the output from that rule is used to match with the corresponding test (T/F) bit. Otherwise the rule is ignored for the path entry. For example, in FIG. 4, the path entry representing Leaf1 (460) will have enable bits corresponding to Rule 0 (410), Rule 1 (420), and Rule 2 (430) set and all of the test bits for these rules will also be set to one. The path table entry for Leaf2 (470) will also have the enable bits corresponding to Rule 0 (410), Rule 1 (420), and Rule 2 (430) set, but the test values will be set only for Rule 0 (410) and Rule 1 (420), while the test bit corresponding to Rule 2 (430) will be reset to zero.

If no path table entries match, a default path can be specified to route packets that have unresolved routing decisions. When multiple paths match, the first match in path table order is selected. In this situation, an interrupt can optionally be generated for multiple matches and unresolved situations (i.e., no matches).

The path type field in the path table 520 for each path is used to provide a selection for each path entry. For example, selection options include OVC, route table (RT) index, a hash leaf or an extract leaf. The OVC mode selects the OVC directly from the data field (path data) of the path table 520 for H&R output 578. The route table index mode selects a route index 575 directly from the data field (path data) of the path table 520. This index is used as an address input 575 to the route table 570 (via multiplexer 577) to look up the target OVC. The hash and extract leaf modules 560 are used to either extract two nibbles from the packet 501, use the IVC 502, or hash on multiple 4 byte words to index into the route table 570.

In a selected embodiment, the route table 570 is a 512-entry memory structure. The contents of the table include the OVC and an optional "next_dest" field used only for PoHT mode at the transmitter ports. Each entry of the route table 570 is memory mapped to one of the 512 route word registers. Each entry in the route table 570 contains a destination field (dest), an OVC/IQ field (OVC/IQ) and a next_dest field (next). The destination field is used internally only by the switch (switch 310 in FIG. 3) and is not transmitted to destination blocks. If the destination is the PMI 322, the OVC/IQ field defines one of the input queues (IQ). Otherwise, if the destination is a transmit port (e.g., 350), the OVC/IQ field defines one of the 16 transmitter OVCs.

In the hash and extract module 560, two sets of hash leaf registers 561 are used to specify the packet data to hash for the hash leaves (e.g., Leaf1 (460) and Leaf2 (470)), respectively. These registers 561 are used when a path table 520 entry specifies one of the hash leaf modes in the path type field. Each set of hash registers 561 is used to extract words or bytes from the packet and enable individual bits for hashing. A hash leaf can optionally select the IVC as part of the hash value. The extracted values are hashed and/or folded to generate a hash key 562 which, in combination with optional folding bits 563 from the path table 520, is used to generate a base address 565 that indexes into the route table 570. For example, the fold bits 563 can optionally fold the hash key 562 down to smaller hash keys 565. The resulting hash key 565 is then added (via multiplexer 567) to a base address value 566 taken from the path data field of the path table 520. This allows the user to allocate a hash result into a contiguous 64, 128, or 256 region of the route table for a particular hash function.

If a path definition does not need to hash on the packet data, then nibbles from the packet can be extracted with extract registers 568 and used as an index into the route table 570. To select this function, an entry in the path table 520 selects either one of the extract registers 568. An extract leaf can select nibbles from either the packet 501 or the IVC 502. These nibbles are combined to form a route table index similar to the hash value 562, which is then added 569 to a base address 566 as an index into the route table 570.

Figure 6:
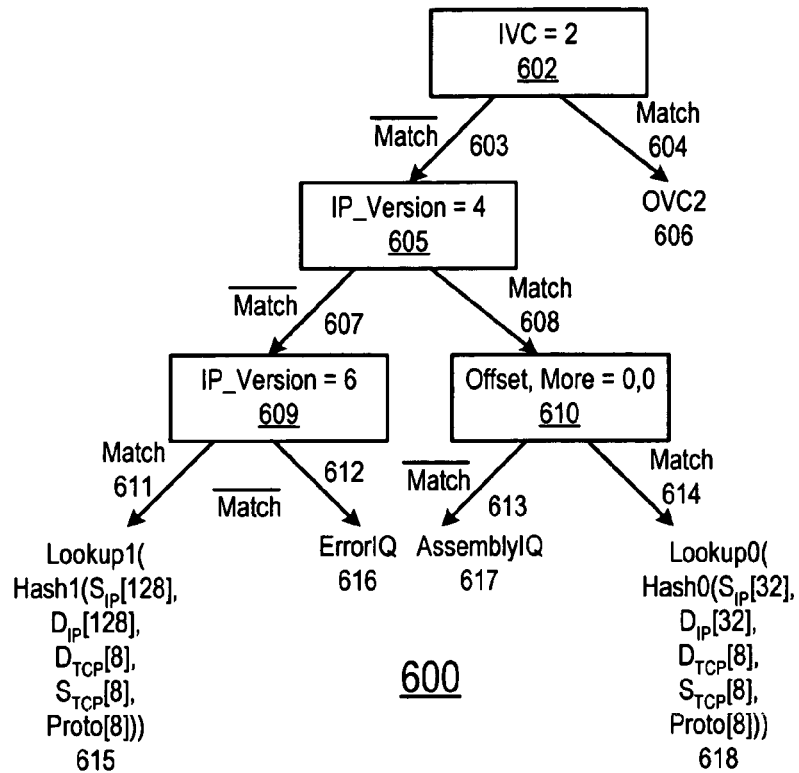
FIG. 6 depicts an example of a decision tree in the hash and route block.
Figure 6:
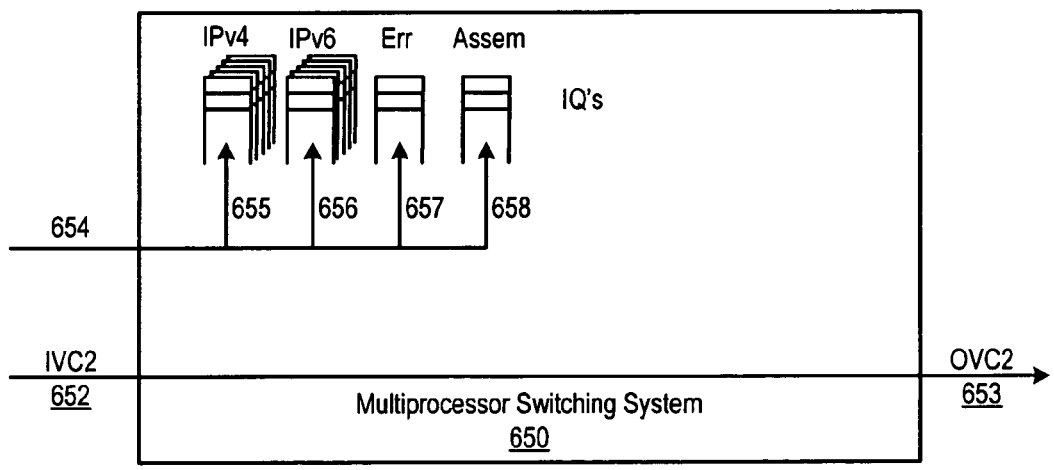

To illustrate a selected embodiment of the present invention, FIG. 6 shows an example of the use of the hash and route functionalities described above. In FIG. 6, a decision tree 600 is illustrated along with a depiction of the corresponding packet flow through a multiprocessor switching chip 650. In this illustration, one input virtual channel (IVC2) 652 to the chip 650 carries data that has already been dealt with or that should not be touched in the chip, so it passes through. The first test 602 in the decision tree diagram 600 checks for IVC2 and makes the decision to pass data through to the OVC of the same number (leaf 606), as illustrated by chip output 653.

As illustrated with the decision tree 600, data in other IVCs is coarsely classified and distributed to input queues (IQs), as illustrated in the chip 650 with routing lines 654. For example, IPv4 traffic is singled out at rule 605 then split again at rule 610 between IP-fragmented traffic (path 613) and non-IP-fragmented traffic (path 614). Fragmented traffic is routed at leaf 617 to a special IQ that stores fragmented packets, as illustrated in the chip 650 with routing line 658. At leaf 618, non-fragmented traffic is IPv4-5-tuple-hashed to make sure that flows always go to the same IQ, and is then distributed to different IQs depending on a table look-up based on the hash value, as illustrated in the chip 650 with routing line 655. At rule 609 and path 611, IPv6 traffic is singled out and IPv6-5-tuple-hashed at leaf 615 (the hash uses different fields than the IPv4 one) and distributed to various IQs depending on the hash value and a table look-up, as illustrated in the chip 650 with routing line 656. Traffic that is neither IPv4 nor IPv6 is singled out at path 612 and goes to a special error IQ, as illustrated in the chip 650 with routing line 657.

As depicted in FIG. 6, traffic that ends up being hashed can be distributed to different IQs or even be forwarded on the same or a different VC to an output port. This is one way to achieve load-balancing inside a chip but also across chips.

As will be appreciated, the present invention may be implemented in a computer accessible medium including one or more data structures representative of the circuitry included in the system described herein. Generally speaking, a computer accessible medium may include storage media such as magnetic or optical media, e.g., disk, CD-ROM, or DVD-ROM, volatile or non-volatile memory media such as RAM (e.g., SDRAM, RDRAM, SRAM, etc.), ROM, etc., as well as media accessible via transmission media or signals such as electrical, electromagnetic, or digital signals, conveyed via a communication medium such as a network and/or a wireless link. For example, data structure(s) of the circuitry on the computer accessible medium may be read by a program and used, directly or indirectly, to implement the hardware comprising the circuitry described herein. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlist(s) comprising lists of gates from a synthesis library. The netlist(s) comprise a set of gates which also represent the functionality of the hardware comprising the circuitry. The netlist(s) may then be placed and routed to produce one or more data set(s) describing geometric shapes to be applied to masks. The masks may then be used in various semiconductor fabrication steps to produce a semiconductor circuit or circuits corresponding to the circuitry. Alternatively, the data structure(s) on computer accessible medium may be the netlist(s) (with or without the synthesis library) or the data set(s), as desired. In yet another alternative, the data structures may comprise the output of a schematic program, or netlist(s) or data set(s) derived therefrom. While a computer accessible medium may include a representation of the present invention, other embodiments may include a representation of any portion of the multiprocessor system and/or the hash and route circuitry (e.g., processors, memory controller, bus, packet manager circuit (or portions thereof), switch, receive/transmit interface circuits (or portions thereof), etc.).

While the system and method of the present invention has been described in connection with the preferred embodiment, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A multiprocessor switching chip, comprising:
    a receiver port;
    a plurality of destination modules within the multiprocessor switching chip; and
    a routing circuit coupled to receive a plurality of packets from the receiver port and programmably configured, for each received packet, to select a destination module for said received packet by calculating a routing signal using one or both of programmably selected control and data information extracted from the received packet as said received packet is being received, said routing circuit comprising
    a first table containing a plurality of independent rules that process data from the received packet in parallel as each packet is received to generate a rule table output for each rule contained in the first table; and
    a second table containing a plurality of paths that combine the rule table outputs from the first table to generate a routing signal for the received packet.

2. The multiprocessor switching chip recited in claim 1 wherein the routing signal is directly output as a routing result from the routing circuit to switch the received packet to a destination module identified by the routing result.

3. The multiprocessor switching chip recited in claim 1 wherein the routing signal is used as an index to a routing table to output a routing result to switch the received packet to a destination module identified by the routing result.

4. The multiprocessor switching chip recited in claim 3, wherein the routing result comprises a switch hop routing signal that is used to route the received packet over a Hyperiransport switch device coupled to the multiprocessor switching chip.

5. The multiprocessor switching chip recited in claim 1, further comprising a hash circuit for hashing predetermined data from the received packet to generate a hash value, wherein the hash value and the routing signal are used to generate an index to a routing table to output a routing result to switch the received packet to a destination module identified by the hash value and the routing result.

6. The multiprocessor switching chip recited in claim 1, further comprising an extract circuit for extracting predetermined data from the received packet to generate an extract value, wherein the extract value and the routing signal are used to generate an index to a routing table to output a routing result to switch the received packet to a destination module identified by the extract value and the routing result.

7. The multiprocessor switching chip recited in claim 1 wherein the routing circuit receives a plurality of interleaved packets on a respective plurality of input virtual channels and the routing signal is encoded in the form of an output virtual channel that is used by the multiprocessor switching chip to route packets to destination modules on the multiprocessor switching chip.

8. The multiprocessor switching chip recited in claim 1, wherein the routing circuit calculates the routing signal without requiring processor intervention.

9. The multiprocessor switching chip recited in claim 1, where the plurality of destination modules comprises a packet manager input circuit and at least one transmit circuit configured to transmit packets integrated on an integrated circuit.

10. The multiprocessor switching chip recited in claim 1, comprising an offset circuit for specifying a location of data information in the received packet that is to be extracted by the routing circuit.

11. The multiprocessor switching chip recited in claim 1, comprising an offset circuit for specifying a location of an offset pointer in the received packet, where said offset pointer specifies a location of data information in the received packet that is to be extracted by the routing circuit.

12. The multiprocessor switching chip recited in claim 1, wherein each rule in the first table selects data from the received packet and compares the selected data to an operand of the rule to generate a true/false result for each comparison which may be output as the rule table outputs.

13. The multiprocessor switching chip as recited in claim 1, where the second table evaluates rule table outputs from the first table using a path table to generate the routing signal that may be output directly as a first routing result or may be used as an index to the routing table to generate a second routing result.

14. A hash and route circuit for routing packet data extracted from a packet received on an input virtual channel to an output virtual channel, comprising:

a decoder for decoding a received packet to extract packet data and input virtual channel information for the packet;

a rule table comprising a plurality of programmable rules, where each rule selects at least one byte from the packet data or the input virtual channel information and compares the selected at least one byte to an operand of the rule to generate a true/false result for the rule;

a path table coupled to receive the true/false results from the rule table, said path table comprising a plurality of entries which search for selected true/false results from the rule table and output path data from a matching entry; and a routing table, wherein the path data from the path table may be directly output as an output virtual channel or may be used as an index to the route table which outputs an output virtual channel or may be used to select an output of a hash function as an index to the route table.

* * * * *